3,131,177
MANUFACTURE OF WATER-SOLUBLE HYDROXYALKYL CELLULOSE ETHERS
Eugene D. Klug, Wilmington, Del., and William D. Roberson, Hopewell, Va., assignors to Hercules Powder Company, Wilmington, Del., a corporation of Delaware
No Drawing. Filed Apr. 13, 1960, Ser. No. 21,868
7 Claims. (Cl. 260—231)

The present invention relates to the preparation of water-soluble hydroxyalkyl cellulose ethers by a slurry process, and more particularly to such a process wherein a substantially water-miscible ketone is used as the diluent or hydroxyalkylation reaction medium under conditions which greatly reduce the loss of diluent.

Although this invention is applicable to the preparation of water-soluble hydroxyalkyl cellulose ethers in general, for the sake of clarity and simplicity it will be described hereinafter for the most part with reference to preparing water-soluble hydroxyethyl cellulose which is a widely used commercial product. Likewise, the present invention will be described hereinafter in large part with reference to acetone as typical of the substantially water-miscible ketones applicable.

MS is used herein to mean the moles of hydroxyalkylating agent (e.g., alkylene oxide) combined per anhydroglucose unit of the cellulose molecule and is determined by the familiar Zeisel-Morgan method.

Slurry processes of preparing water-soluble hydroxyalkyl cellulose ethers are well known in the art and extensively represented in the literature. In the manufacture of hydroxyethyl cellulose, one of the most difficult problems is purification, that is the removal of the alkali, usually sodium hydroxide, at the end of the hydroxyalkylation reaction. This is generally accomplished by neutralizing the sodium hydroxide and washing out the sodium salt with a mixture of an organic solvent and water. The function of the organic solvent is to keep the hydroxyethyl cellulose from dissolving. The water is present to dissolve out the sodium salt. Because of the highly hydrophilic nature of the hydroxyethyl cellulose, this operation is very difficult. Most aqueous organic solutions which do not dissolve the hydroxyethyl cellulose are poor solvents for the sodium salts.

One of the most satisfactory solvents for removing the sodium salts is aqueous acetone of about 70%–90% concentration. It is very desirable for efficiency of manufacture of the hydroxyethyl cellulose to use the same organic liquid for both the hydroxyalkylation reaction diluent and the purification solvent because it simplifies the solvent recovery.

In view of the above it would be highly desirable to be able to use acetone both for the hydroxyalkylation reaction diluent and the purification solvent. Unfortunately, however, acetone has one quite serious disadvantage as a reaction diluent. During the hydroxyalkylation which occurs at an elevated temperature, the acetone undergoes a reaction under the influence of heat and the sodium hydroxide to form mesityl oxide. Under the conditions of the hydroxyalkylation reaction, the extent of the side reaction is such that the loss of acetone significantly increases the cost of manufacturing the hydroxyalkyl cellulose.

An object of this invention is to provide a process of manufacturing water-soluble hydroxyalkyl cellulose ethers. Another object is to provide such a process wherein a substantially water-miscible ketone is used as the hydroxyalkylation diluent. A still further object is to provide such a process wherein the prior art loss of ketone during hydroxyalkylation is greatly reduced. The above and other objects will be apparent from the description of this invention given hereinafter.

The above and other objects are accomplished according to this invention by carrying out the process which comprises hydroxyalkylating cellulose to an MS not exceeding 1.0 in the presence of a substantially water-miscible ketone alkali and water, the alkali/cellulose and water/cellulose ratios being 0.2/1–0.8/1 and 0.8/1–4.0/1, respectively, neutralizing 70%–98% of the alkali, continuing the hydroxyalkylation to an MS of about 1.5–3.0. That is, we have found that the acetone loss from by-product formation can be significantly reduced by effecting only a portion of the hydroxyalkylation in the presence of a large amount of alkali, neutralizing practically all of the alkali present, and then completing the hydroxyalkylation in the presence of the remaining extremely small amount of alkali, and this is accomplished with substantially no interruption of the hydroxyalkylation during the entire process since there is no washing or drying of the hydroxyalkyl cellulose until the final product is obtained.

The following examples illustrate various embodiments of the present invention but they are not intended to limit the invention beyond its scope as defined in the claims of this application. Percent, ratios and parts in the examples and elsewhere herein are by weight unless otherwise indicated. All ratios involving cellulose or hydroxyalkyl cellulose are based on the air dry weight thereof. All ratios involving alkali are based on sodium hydroxide. Although the term "slurry process" is reasonably well understood in this art, perhaps it will be desirable to define what we mean by it. By slurry process we mean one in which an inert organic diluent or hydroxyalkylating reaction medium is used. Such diluents are discussed more fully hereinafter. The amount of mesityl oxide was measured both by mass spectrometry and vapor chromatography. Both methods gave substantially the same values. The values reported in this application are those obtained by mass spectrometry, since the art considers them to be more accurate and quantitative than the vapor chromatography data.

EXAMPLE 1 (TABLE 1)

*Control*

A mixture of 1130 parts acetone, 144 parts water, 36 parts flake sodium hydroxide and 120 parts finely divided cotton linters were vigorously stirred 1 hour at 20° C.–25° C. Then 126 parts ethylene oxide were added. With continued agitation the mixture was heated to 80° C. in 1½ hours and held at 80° C. for 1½ hours. The resulting reaction mixture was cooled to room temperature, a sample of the acetone was taken from the cooled reaction mixture and the mesityl oxide content thereof was determined. Then the alkali in the cooled reaction mixture was neutralized with glacial acetic acid and the hydroxyethyl cellulose product was purified by washing with 70%–75% aqueous acetone. The product was then dehydrated with substantially anhydrous acetone and dried.

Further details appear in Table 1 hereinafter.

EXAMPLE 2 (TABLE 1)

*Present Invention*

A mixture of 1130 parts acetone, 144 parts water, 36 parts flake sodium hydroxide and 120 parts finely divided cotton linters were vigorously stirred 1 hour at 20° C.–25° C. Then 126 parts ethylene oxide were added. With continued agitation the mixture was heated to 80° C. in 1½ hours. Then 80% of the sodium hydroxide was neutralized by adding 43.2 parts glacial acetic acid and the hydroxyalkylation reaction was continued to completion by holding it at 80° C. for 1½ hours with agitation. The resulting reaction mixture was cooled to room temperature, a sample of the acetone was taken from the cooled reaction mixture and the mesityl oxide content thereof was determined. Then the alkali in the cooled reaction mixture was neutralized with glacial acetic acid and the hydroxyethyl cellulose product was purified by washing with 70%–75% aqueous acetone. The product was then dehydrated with substantially anhydrous acetone and dried.

Further details are given in Table 1 hereinafter.

EXAMPLES 3–5 (TABLE 1)

*Present Invention*

Using substantially the same procedure as in Example 2 above the effect of using other neutralizing acids and the effect of using different amounts of acids were determined. Likewise, the hydroxyethyl cellulose product was purified and dried in the same manner as in Example 2 above.

Further details appear in Table 1 hereinafter.

TABLE 1 (EXAMPLES 1–5)

| Example No. | Neutralization | | Mesityl Oxide[1] | Properties of HEC[2] Product | | Hydroxy- alkylation Efficiency[3] |
|---|---|---|---|---|---|---|
| | Amount of Alkali Neutralized Percent | Acid Used | | MS | Solution Quality | |
| 1 | None (control) | None | 0.17 | 2.76 | Good | 67.8 |
| 2 | 80 | Acetic | 0.052 | 2.63 | ----do-- | 63.9 |
| 3 | 95 | ----do-- | 0.021 | 2.78 | ----do-- | 68.3 |
| 4 | 80 | Nitric | 0.049 | 2.70 | ----do-- | 66.3 |
| 5 | 90 | ----do-- | 0.023 | 2.68 | ----do-- | 65.8 |

[1] Parts/part HEC product.
[2] HEC is hydroxyethyl cellulose.
[3] Efficiency = $\dfrac{\text{MS as moles per anhydroglucose unit}}{\text{Ethylene oxide input in moles per anhydroglucose unit}} \times 100$ The above examples quite strikingly demonstrate the contribution of our invention to the art. This will be even more readily apparent by converting this data into dollars saved. Thus with a 50,000 lb. per day production of hydroxyethyl cellulose our invention as compared with the art (Example 1 vs. Example 3 above) would save approximately $230,000 annually using 8.5¢ per lb. as the current tank car price for acetone.

As those skilled in this art will appreciate many variables may be made in the above conditions within the scope of the present invention defined in the appended claims.

The alkali/cellulose and water/cellulose ratios used prior to neutralization may be 0.2/1–0.8/1 and 0.8/1–4.0/1, respectively. Still better results are obtained if the alkali/cellulose and water/cellulose ratios used prior to neutralization are 0.3/1–0.5/1 and 1.2/1–2.5/1, respectively. It is also important to provide excellent contact between the cellulose and other constituents of the reaction mixture, i.e., the alkali, hydroxyalkylation agent, water, and diluent. This contact is accomplished by using the proper mechanical conditions such as vigorous and thorough agitation of the hydroxyalkylation reaction mixture.

The time during the hydroxyalkylation reaction at which the alkali is neutralized (as measured by the MS of the hydroxyalkyl cellulose being made) and the amount of the alkali neutralized are interdependent. The higher the MS of the hydroxyalkyl cellulose at the time of neutralization the greater the amount of the alkali which may be neutralized. The reason for this is that the lower MS ethers need more alkali during completion of the hydroxyalkylation after neutralization than do the higher MS ethers. Generally, we neutralize 70%–98% of the alkali when the hydroxyalkylation has proceeded to an MS not exceeding about 1.0, preferably 80%–90% when the hydroxyalkylation has proceeded to an MS of 0.2–0.6. In the folowing Table 2 specific examples are used to more clearly illustrate this.

TABLE 2[1]

| Amount Alkali Neutralized | | Amount Alkali Unneutralized | | MS[2] |
|---|---|---|---|---|
| Percent | Parts | Percent | Parts | |
| 0 | 0 | 100 | 0.3 | Control |
| 95 | 0.285 | 5 | 0.015 | 0.6–1.0 |
| 90 | 0.27 | 10 | 0.03 | 0.4–0.6 |
| 80 | 0.24 | 20 | 0.06 | 0.2–0.4 |
| 70 | 0.21 | 30 | 0.09 | 0.1–0.2 |

[1] Based on starting hydroxyalkylation with 0.3/1 alkali/cellulose ratio.
[2] Preferred minimum MS of hydroxyalkyl cellulose at time neutralized.

Any ketone which is substantially water miscible is applicable to the present invention. These ketones include acetone and methyl ethyl ketone, but normally acetone will be used for economic and other obvious reasons.

Although this invention has been found quite useful in making water-soluble hydroxyalkyl cellulose ethers of MS about 1.5–3 it is not limited thereto and one may go somewhat outside this range.

The water/cellulose ratio used after neutralization may be varied widely, e.g., about 1/1–20/1 and usually one will operate within the range of about 1.2/1–6/1.

This invention is applicable to the manufacture of any water-soluble hydroxyalkyl cellulose ether which includes hydroxyethyl cellulose, hydroxypropyl cellulose, hydroxybutyl cellulose, and mixtures of these.

The prior art has used several hydroxyalkylating agents to prepare water-soluble hydroxyalkyl cellulose ethers. These include alkylene oxides, e.g., ethylene oxide, propylene oxide, 3,4-epoxy-1-butene. All of such alkylene oxides are operable in the present invention.

Various alkalies are applicable to the present invention, but we prefer to use the alkali metal hydroxides, e.g., sodium hydroxide and potassium hydroxide.

For neutralizing the alkali we may use various materials including acetic acid, hydrochloric acid, nitric acid, propionic acid, benzoic acid, and mixtures of these. Hydroxyalkylating conditions, e.g., temperature, time, purification solvents, ratio of other components of the reaction mixture, etc., are so well known in this art and so extensively represented in the literature that they need no further discussion in this application. Likewise, this applies to the types of cellulosic materials which may be used. However, as pointed out hereinbefore, normally one will find it more desirable to purify with the same material, i.e., the ketone, used as the hydroxyalkylation diluent.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of preparing water-soluble hydroxyalkyl cellulose ethers in the presence of a substantially water-miscible ketone comprising hydroxyalkylating cellulose to an MS not exceeding 1.0 in the presence of an alkali and water, the alkali/cellulose and water/cellulose ratios being 0.2/1–0.8/1 and 0.8/1–4.0/1, respectively, neutralizing 70%–98% of the alkali, continuing the hydroxyalkylation in the presence of the remaining alkali and the resulting neutralization product to an MS of about 1.5–3.0 employing a water/hydroxyalkyl cellulose ratio of 1/1–20/1.

2. Process of claim 1 wherein the alkali/cellulose and water/cellulose ratios are 0.3/1–0.5/1 and 1.2/1–2.5/1, respectively, the hydroxyalkylation is carried out to an MS of 0.4–0.6 prior to the neutralization, and 90% of the alkali is neutralized.

3. Process of claim 1 wherein the ketone is acetone.

4. Process of claim 1 wherein the ketone is methyl ethyl ketone.

5. Process of claim 1 wherein the hydroxyalkyl cellulose ether is hydroxyethyl cellulose.

6. Process of preparing water-soluble hydroxyalkyl cellulose ethers in the presence of a substantially water-miscible ketone as diluent comprising hydroxyalkylating cellulose to an MS not exceeding 1.0 in the presence of an alkali and water, the alkali/cellulose and water/cellulose ratios being 0.2/1–0.8–1 and 0.8/1–4.0/1, respectively, neutralizing 70%–98% of the alkali, continuing the hydroxyalkylation in the presence of the remaining alkali and the resulting neutralization product to an MS of about 1.5–3.0, employing a water/hydroxyalkyl cellulose ratio of 1.2/1–6/1 purifying and drying the resulting hydroxyalkyl cellulose product.

7. Process of claim 6 wherein the diluent and purifying solvent is acetone.

References Cited in the file of this patent

UNITED STATES PATENTS

| | | |
|---|---|---|
| Re. 24,116 | Klug | Jan. 31, 1956 |
| 1,876,920 | Hagedorn et al. | Sept. 13, 1932 |
| 2,055,892 | Dreyfuss | Sept. 29, 1936 |
| 2,891,056 | Wagner | June 16, 1959 |

OTHER REFERENCES

Ind. and Eng. Chem., volume 29, No. 1, pages 114–117.

UNITED STATES PATENT OFFICE
CERTIFICATE OF CORRECTION

Patent No. 3,131,177                                                     April 28, 1964

Eugene D. Klug et al.

It is hereby certified that error appears in the above numbered patent requiring correction and that the said Letters Patent should read as corrected below.

Column 2, lines 4 and 5, for "of a substantially water-miscible ketone alkali" read -- of an alkali, a substantially water-miscible ketone --; column 3, TABLE 1, footnote 2, for "hydroxtethyl" read -- hydroxyethyl --.

Signed and sealed this 8th day of September 1964.

(SEAL)
Attest:

ERNEST W. SWIDER                                         EDWARD J. BRENNER
Attesting Officer                                                 Commissioner of Patents